United States Patent
Boulden et al.

(10) Patent No.: US 9,982,683 B2
(45) Date of Patent: May 29, 2018

(54) BUSHING SEAL FOR USE IN A PUMP

(71) Applicant: Boulden Company, Inc., Conshohocken, PA (US)

(72) Inventors: Brian Boulden, Conshohockhen, PA (US); Robert Aronen, Conshohocken, PA (US)

( * ) Notice: Subject to any disclaimer, the term of this patent is extended or adjusted under 35 U.S.C. 154(b) by 463 days.

(21) Appl. No.: 14/583,912

(22) Filed: Dec. 29, 2014

(65) Prior Publication Data
US 2016/0186769 A1    Jun. 30, 2016

(51) Int. Cl.
*F04D 29/12* (2006.01)
*F16J 15/44* (2006.01)
*B29D 99/00* (2010.01)
*F04D 29/10* (2006.01)
*B29K 101/12* (2006.01)
*F04D 1/06* (2006.01)

(52) U.S. Cl.
CPC ......... *F04D 29/12* (2013.01); *B29D 99/0053* (2013.01); *F04D 29/10* (2013.01); *F04D 29/128* (2013.01); *F16J 15/441* (2013.01); *B29K 2101/12* (2013.01); *F04D 1/06* (2013.01)

(58) Field of Classification Search
CPC .... F04D 29/12; F04D 29/128; F04D 29/2266; F04D 1/06; F04D 13/0633; F04D 25/062; F04D 29/04; F04D 29/046; F04D 29/0462; F04D 29/05; F04D 29/056; F04D 29/0563; F04D 29/10; F04D 29/106; F04D 29/126; F05D 2240/55; F16C 17/02; F16C 17/18; F16C 33/20; B29D 99/0053; F16J 15/441; B29K 2101/12

See application file for complete search history.

(56) References Cited

U.S. PATENT DOCUMENTS 3,740,162 A    6/1973  Tuomaala
3,746,415 A *  7/1973  Thomson ............... F16C 17/02
                                                     384/153
(Continued)

FOREIGN PATENT DOCUMENTS

CN    202073825 U    12/2011
CN    103486074 A    1/2014
(Continued)

OTHER PUBLICATIONS

Polyethylene. (Feb. 4, 2017). In Wikipedia, The Free Encyclopedia. Retrieved Feb. 9, 2017, from https://en.wikipedia.org/w/index.php?title=Polyethylene&oldid=763643755.*

(Continued)

*Primary Examiner* — Woody Lee, Jr.
*Assistant Examiner* — Sang K Kim
(74) *Attorney, Agent, or Firm* — Inspired Idea Solutions Law Firm; Wayne Carroll

(57) ABSTRACT

A device is disclosed including a shaft seal made with thermoplastic material formed as a hollow cylinder with an inside diameter and an outside diameter. The hollow cylinder may have multiple passages through the thermoplastic material between the inside diameter and the outside diameter. The multiple passages between the inside diameter and the outside diameter allow fluid under pressure to pass between the inside diameter and the outside diameter through the multiple passages.

13 Claims, 4 Drawing Sheets

(56) References Cited

U.S. PATENT DOCUMENTS

| | | | | |
|---|---|---|---|---|
| 4,358,253 | A * | 11/1982 | Okano | F01D 25/166 384/368 |
| 4,514,099 | A * | 4/1985 | John | F16C 17/02 384/100 |
| 4,902,144 | A * | 2/1990 | Thoren | F01D 25/166 384/287 |
| 5,322,372 | A * | 6/1994 | You | F16C 33/14 384/285 |
| 5,553,868 | A | 9/1996 | Dunford | |
| 6,241,393 | B1 * | 6/2001 | Georges | F16C 33/102 384/130 |
| 6,981,799 | B2 * | 1/2006 | Sturm | F04D 29/026 384/297 |
| 8,540,478 | B2 * | 9/2013 | Teragaki | F04D 1/063 277/369 |
| 9,284,978 | B2 * | 3/2016 | Corts | F16C 13/02 |
| 2009/0045589 | A1 | 2/2009 | Patton et al. | |
| 2014/0254963 | A1 * | 9/2014 | Blair | F16C 17/028 384/115 |
| 2017/0108399 | A1 * | 4/2017 | Rhee | G01M 3/2869 |

FOREIGN PATENT DOCUMENTS

| | | |
|---|---|---|
| CN | 103742438 A | 4/2014 |
| KR | 10-2012-0001401 A | 1/2012 |
| RU | 2 018 719 C1 | 8/1994 |
| RU | 2 191 296 C1 | 10/2002 |
| RU | 2 202 051 C2 | 4/2003 |

OTHER PUBLICATIONS

DuPont Vespel CR-6100 (2010). DuPont. Retrieved Feb. 8, 2017, from http://www.dupont.com/content/dam/dupont/products-and-services/plastics-polymers-and-resins/parts-and-shapes/vespel/documents/CR6100_ProductDataSheet.pdf.*

"Damper Seals | Honeycomb, Hole Pattern & Pocket Damper Seals", available on http://www.bearingsplus.com/sealing-technologies/damper-seals/, 3 pages.

"High-Performance Plastic Materials Guide" available on https://es.scribd.com/document/120784689/High-Performance-Plastic-Materials-Guide-Aug-2009, Aug. 2009, 8 pages.

"How to Respond to Mechanical Seal Leakage in a Centrifugal Pump—Modern Pumping Today® Modern Pumping Today®" available on http://www.modernpumpingtoday.com/respond-mechanical-seal-leakage-centrifugal-pump/ dated May 15, 2017, 6 pages.

Aronen, Robert, "The Power of Wear Rings" Maintenance Minders, Pumps and Systems, Mar. 2011, 6 pages.

"Antique Minneapolis Moline / B.F. Avery Tractor Parts" Tractor Parts for your Antique Tractor—Antiquetractorsrus, available on http://www.antiquetractorsrus.com/minnemotractorparts/fuel/minnemofuelparts1.html, dated Aug. 12, 2014, 6 pages.

"Brass Throttle Bushing" available on http://www.carburetor-parts.com/Brass-Throttle-Bushing_p_444.html#, dated Aug. 12, 2014, 2 pages.

"Bronze wrapped bushing with through holes (FT-090)" available on http://www.esbearing.com/products-ft090.asp, dated Aug. 12, 2014, 2 pages.

"GYF2516H Flanged CuSn8 Bronze bushing—GetYourBearings.co.uk" available on http://www.getyourbearings.co.uk/other-parts/GYF2516H.html, dated Aug. 12, 2014, 2 pages.

"JDB oilless graphite brass bushing" available on http://sf-bearing.en.alibaba.com/product/424376814-50004970/JDB_oilless_graphite_brass_bushing.html, dated Aug. 12, 2014, 2 pages.

"Multi-Holes Bushing for Injection Molding Machine" available on http://www.wzchutian.com/5-8-multi-holes-bushing-injection.html, dated Aug. 12, 2014, 1 page.

"Oilless Slide bush / Steel Backing Bronze DU Teflon bearing bush / Graphite bush" available on http://www.aliexpress.com/item/Oilless-Slide-bush-Steel-Backing-Bronze-DU-Teflon-bearing-bush-Graphite-bush/1976738853.html, Aug. 12, 2014, 7 pages.

"Rolled Bronze Bushings with Indents" available on http://www.asbbearings.com/rolled_bushing.html, Aug. 12, 2014, 1 page.

"Sealing Sense" From the voice of the fluid sealing industry, available on http://www.fluidsealing.com/sealingsense/aug08.pdf, Aug. 2008, pp. 112-114.

Dr. Luis San Andres "Damper Seals and Hydrostatic Bearings for Pump Applications" Presentation for lectures 2 (a) and 12(b) Based on Lecture (3) delivered at Von Karman Institute, Nov. 2009.

Dr. Luis San Andres, "Notes 12(a): Annular Pressure Seals" Nov. 2010.

* cited by examiner

BUSHING SEAL FOR USE IN A PUMP

BACKGROUND

1. Technical Field

This disclosure relates to pumps, and more specifically bushings which also act as high differential pressure seals within a pump such as a centrifugal pump.

2. Background Art

Pumps, such as centrifugal pumps, operate with a motor connected to a shaft, which is connected to an impeller. Movement of the impeller creates pressure within a housing and causes fluid to flow. For example a pump is used to move water in a heating system, where a boiler heats the water and a pump creates pressure to force the water through pipes so the hot water can be delivered to the desired location.

The motor on the pump is typically outside of the fluid environment, and the shaft connected to the motor transfers the energy of the motor from outside the fluid environment, to inside the fluid environment. Within the pump, there are several bushings or "seals" which serve to separate the higher pressure areas from lower pressure areas within the pump. These seals are called wear rings, throttle bushings, center-stage bushings, or balance drum bushings.

The leakage across the bushing seals and other seals in a pump (wear rings, throttle bushings) is a significant factor in pump efficiency. Reducing the leakage increases pump efficiency.

BRIEF SUMMARY

A device is disclosed including a shaft seal made with thermoplastic material formed as a hollow cylinder with an inside diameter and an outside diameter. The hollow cylinder may have multiple passages through the thermoplastic material between the inside diameter and the outside diameter. The multiple passages between the inside diameter and the outside diameter allow fluid under pressure to pass between the inside diameter and the outside diameter through the multiple passages.

The multiple passages between the inside diameter and the outside diameter may be relatively evenly spaced around the outside diameter. The hollow cylinder may have an outside radius (R), and a length (L), and an outside surface area. The outside surface area is measured as 2πRL, and each of the multiple passages between the inside diameter and the outside diameter comprise a portion of the outside surface area. In an example embodiment a combination of the portions of the outside surface area from the multiple passages may be at least 4 percent of the outside surface area. In another embodiment a combination of the portions of the outside surface area from the multiple passages may be no more than 25 percent of the outside surface area. Another example embodiment includes a combination of the portions of the outside surface area from the multiple passages that are at least 4 percent of the outside surface area, and no more than 25 percent of the outside surface area The device may be inserted into a housing having a solid wall in contact with the outside diameter of the device. The thermoplastic material may have a low coefficient of thermal expansion. The low coefficient of thermal expansion of the thermoplastic material may be lower than a coefficient of thermal expansion of carbon steel. The thermoplastic material may be impervious to water. The thermoplastic material may be a substantially chemically inert material.

The multiple passages between the inside diameter and the outside diameter may be a substantially uniform shape and size. The multiple passages may be holes each formed parallel to a radius of the hollow cylinder.

A centrifugal pump is disclosed including an impeller, a rotating shaft, a thermoplastic bushing, and a housing. The housing may have a solid housing wall, and the thermoplastic bushing may be inserted into the housing against the solid housing wall. The impeller may be connected to the rotating shaft, and the rotating shaft may be supported by the thermoplastic bushing. The shaft may pass through the thermoplastic bushing. The thermoplastic bushing may have multiple passages that allow fluid under pressure to pass between the rotating shaft and the solid housing wall.

The centrifugal pump may be a multi-stage high-pressure centrifugal pump. The thermoplastic bushing has an outside radius (R), and a length (L), and an outside surface area, wherein the outside surface area is measured as 2πRL, and the multiple passages between the shaft and the solid housing wall comprise a portion of the outside surface area. A combination of the portions of the outside surface area from the multiple passages may be at least 4 percent of the outside surface area, and may be no more than 25 percent of the outside surface area.

A product made by a method is also disclosed including, forming a shaft seal for use with a rotating shaft by forming a hollow cylinder from thermoplastic material. The hollow cylinder having an inside diameter and an outside diameter. The method of making the product may include forming multiple passages in the hollow cylinder through the thermoplastic material between the inside diameter and the outside diameter, such that the multiple passages between the inside diameter and the outside diameter allow fluid under pressure to pass between the inside diameter and the outside diameter through the multiple passages. The multiple passages may be formed by drilling multiple holes in the hollow cylinder. The multiple passages may be formed using a process that forms the multiple passages at the same time that the hollow cylinder is formed. The multiple passages may also be formed using three-dimensional printing of a suitable medium or a mold. The hollow cylinder may be inserted into a metal housing having a solid housing wall.

A shaft seal for the rotating shaft of a centrifugal pump is also disclosed which may include an outer layer made from a solid metallic material, and an inner layer contacting the outer layer. The inner layer may be made from a non-metallic material, and may have a first side configured to be in close proximity to a rotating shaft in the centrifugal pump. The inner layer may have a second side which is in contact with the outer layer. The inner layer may have multiple holes between the first side and the second side.

DETAILED DESCRIPTION

The disclosed embodiments provide advantages over the current state of technology in pump seals in one or more ways. In an example embodiment a shaft seal includes a non-metallic bushing that is pressed into a metal casing or housing with tight running clearance between the shaft and the shaft seal. The seal separates a high pressure environment and a low pressure environment (low being relative to the high pressure environment). When there is a large enough pressure differential between the high pressure side and the low pressure side, the pressure can act on the shaft seal to move the shaft seal along the shaft and out of the casing, which would cause failure of the shaft seal.

Figure 1:
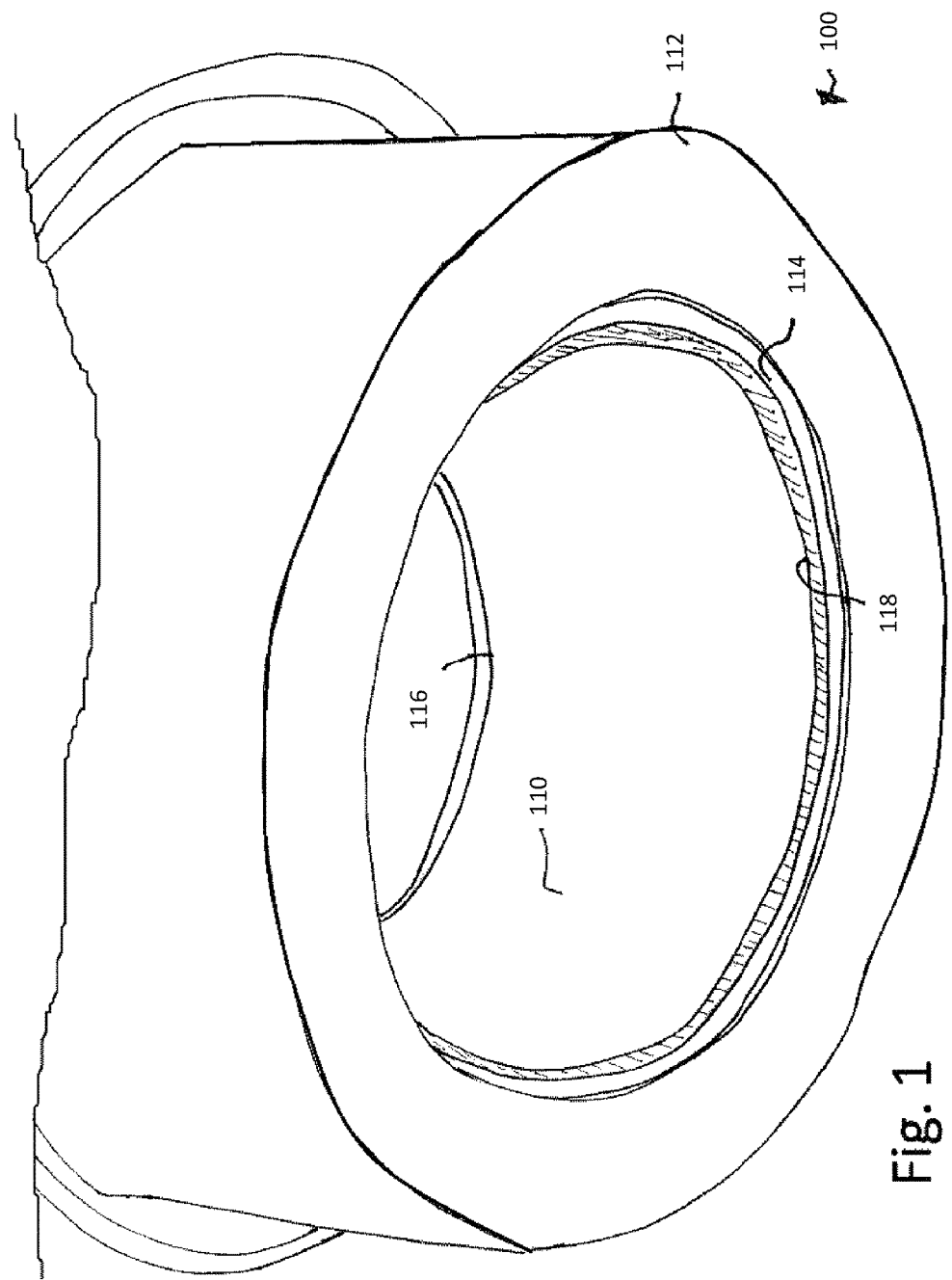
FIG. 1 is a perspective view of an embodiment of a shaft seal.

A stopping structure such as a shoulder can be used on the low pressure side to prevent the shaft seal from moving. A system similar to the one shown in FIG. 1 was constructed and analyzed. FIG. 1 shows a device 100 that can be used as a seal for a rotating shaft. In this example the shaft seal 100 has a metal housing 112 and a non-metallic bushing 110. The metal housing 112 has a shoulder 114 that is part of the metal housing 112 and acts as a stop for the non-metallic bushing 110. In this example a shaft may be used with the shaft seal 100, and the clearance between the shaft and the non-metallic bushing may be small, for example 8 to 10 thousandths of an inch. A smaller clearance provides the advantage of less leakage through the seal, and greater efficiency of the system. Tighter clearances can also reduce vibrations in the shaft that can also negatively affect performance of the system. The side with the shoulder 114 is a low pressure side, which is a low pressure relative to the opposite side of the shaft seal 100, which is a high pressure side.

With the example of FIG. 1 failures were identified where the non-metallic bushing deformed due to pressure of a high pressure differential system. In some cases the bushing deformed sufficient to move the bushing over the shoulder 114, causing significant reduction in the performance of the system, or failure of the system.

The failure was caused by fluid pressure acting on the bushing 110. The internal diameter of the bushing 110 had high pressure applied due to the high pressure environment on the high pressure side 116, and the pressure was lower when calculated closer to the shoulder 114. The pressure in the system of FIG. 1 was found to be pressing outward on the inner diameter of the bushing 110 with a greater force at the high pressure side 116 than at the shoulder 114 or low pressure side. Fluid pressure was also found to act on the outer diameter of the bushing 110, between the bushing 110 and the housing 112. The pressure on the outer diameter of the bushing 110, however, was near or equal to the high pressure of the high pressure side 116 on both the high pressure side 116 and at the low pressure side by the shoulder 114. It was found that the high pressure 127 on the outer diameter 122 of the bushing 110 was acting on the bushing 110 with an inward force that was substantially the same on both the high pressure side 116 and the low pressure side 118 of the system.

Figure 2:
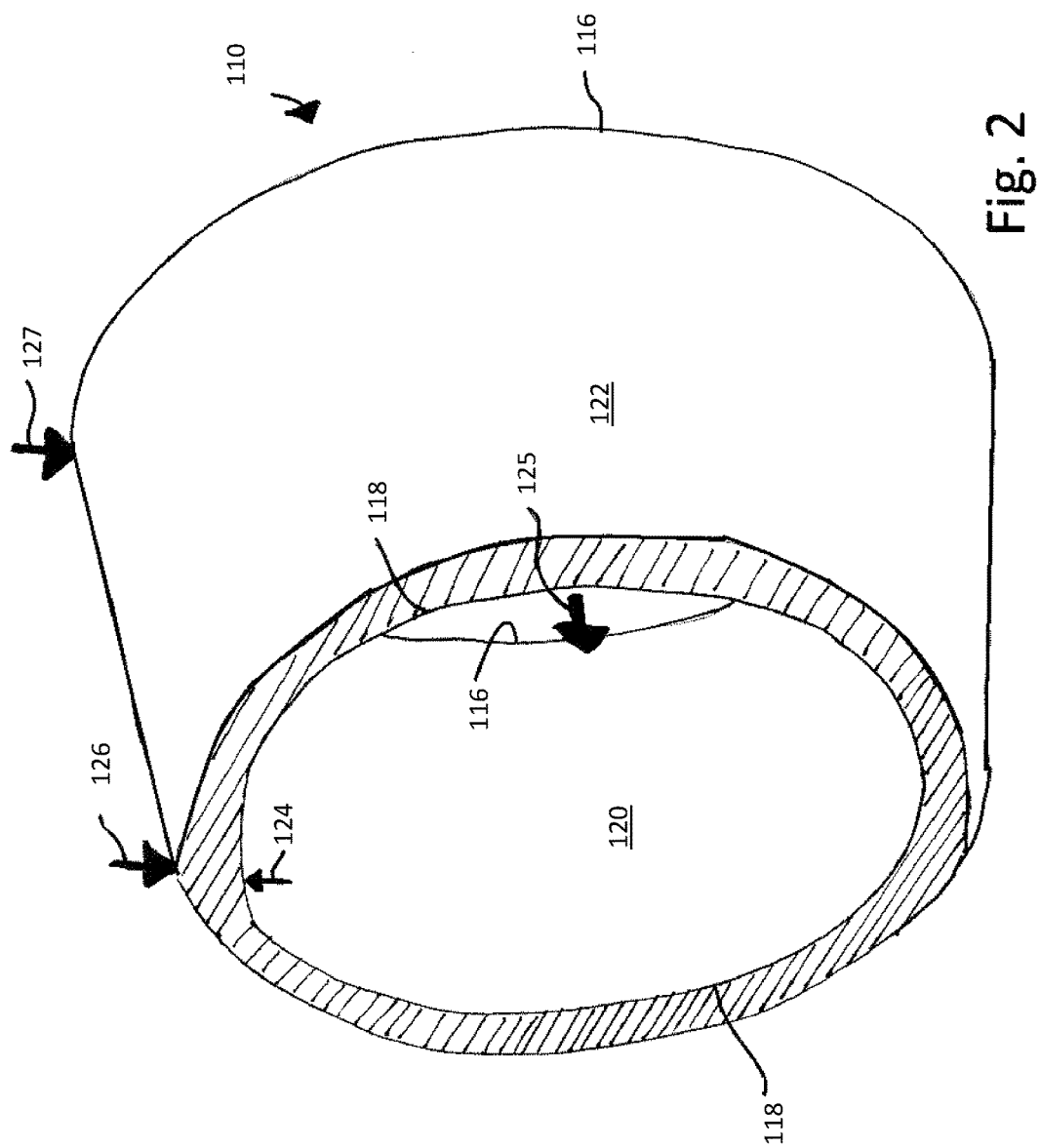
FIG. 2 is a perspective view of a bushing.

FIG. 2 shows an exaggerated example of the deformation caused by the pressure differential as discussed above regarding the system of FIG. 1, with a lower pressure 124 acting on the inner diameter 120 of the bushing 110 on the low pressure side 118, and a higher pressure 126 acting on the outer diameter 122 of the bushing 110 at the low pressure side 118.

In one case study with the bushing of FIG. 1, the pressure in a high pressure environment is around 3210 PSI and the pressure in the low pressure environment, is around 1600 PSI. The high pressure at about 3210 PSI acts on the outer diameter 122 of the bushing 110, between the bushing 110 and the housing 112. The high pressure acts substantially at the same pressure on the high pressure side 116 and the low pressure side 118 on the outer diameter 122 of the bushing, with a pressure of about 3210 PSI. The pressure in the inner diameter of the bushing, between the bushing 110 and the shaft varies (in this case study the clearance is about 8 to 10 thousandths of an inch between the shaft and the bushing 110). Near the high pressure side the pressure 125 on the inner diameter 120 of the bushing is about 3200 PSI. The pressure acting on the inner diameter of the bushing 110 decrease regularly from the pressure 125 of 3210 PSI at the high pressure side, to the pressure 124 of 1600 PSI at the low pressure side.

The non-metallic material used for the bushing 110 may be deformable, and will deform when placed under conditions of high pressure differential. The non-metallic material may also be subjected to high temperatures, such as the temperatures in a centrifugal pump used to move hot water in a heating system, which high temperatures may decrease the pressure differential needed to deform the non-metallic bushing material.

In failure analysis of the case study, it was found that the pressure differential between the outer diameter 122 and the inner diameter 120 of the bushing 110 would cause deformation of less than 1 thousandths of an inch at the high pressure side where the pressure differential between the outer diameter and the inner diameter was very small. The deformation at the low pressure side, however, would be around 27 thousandths of an inch, which was determined to be the cause of the system failure, since there was only a clearance of 8-10 thousandths of an inch between the bushing and the shaft.

Figure 3:
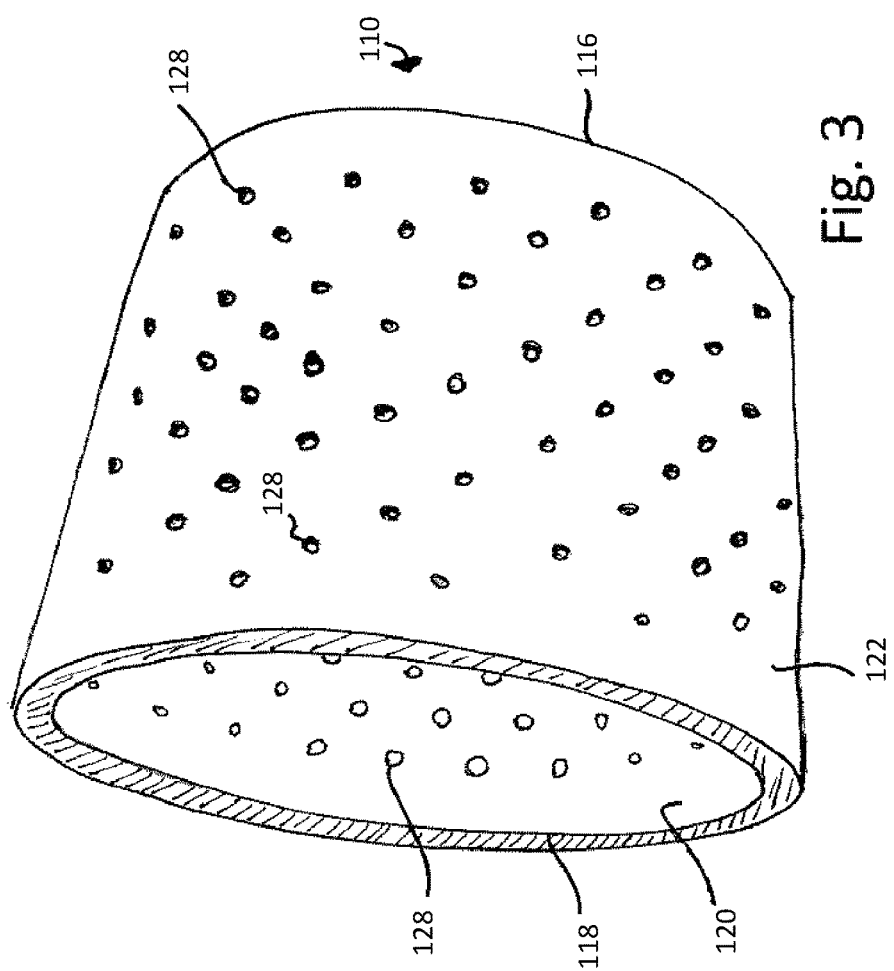
FIG. 3 is a perspective view of a bushing with holes.

To solve this problem, the bushing was modified as shown in FIG. 3, with holes formed through the bushing from the outer diameter 122 to the inner diameter 120 at regular intervals. This allows the pressure from the outer diameter to be relieved through the holes so that a large pressure differential does not form between the outer diameter and the inner diameter of the bushing 110.

Analysis based on the same conditions discussed in the case study above showed that the bushing of FIG. 3 had less than 2 thousandths of an inch deformation in the direction of the radial axis (or in the direction of the radius of the shaft), which is an acceptable deformation for a running clearance of 8-10 thousandths of an inch.

The holes were also found to provide a benefit to absorb deformation in the axial axis (or in the direction of the axis of the shaft). In the case study with a pressure differential of 1600 PSI between the high pressure side and the low pressure side, axial deformation occurs, and the holes become slightly elongated as deformation is able to occur.

Another advantage of placing holes in the bushing is a reduction of tangential whirl of the fluid between the inner diameter of the bushing 110, and the shaft. The holes create a disruption to the flow of fluid as it rotates with the shaft. Tangential whirl can de-stabilize a system.

The bushing with holes may also have the effect of reducing net leakage in some systems. The holes can act to disrupt axial flow of fluid. The bushing with holes can be used with other features to reduce tangential whirl, such as labyrinth fingers connected to the shaft or rotor, which may correspond to groves or structures on an opposing surface from the shaft or rotor.

Although axial flow of fluid may be reduced by the holes, they still allow flow so that the Lomakin Effect is still able to stabilize the shaft.

The use of holes in the bushing may be used on long or short seals, and is only pressure-limited by the high temperature strength of the non-metallic material used. The bushing non-metallic material may be, thermoplastics, composites and chemically-resistant polymers. In one example the material of the non-metallic material is DuPont™ Vespel® CR-6100.

The technique described may be applied to narrow bushings such as wear rings. Long or short seals may be used with holes to prevent or reduce distortion from pressure differentials as well as other benefits.

Figure 4:
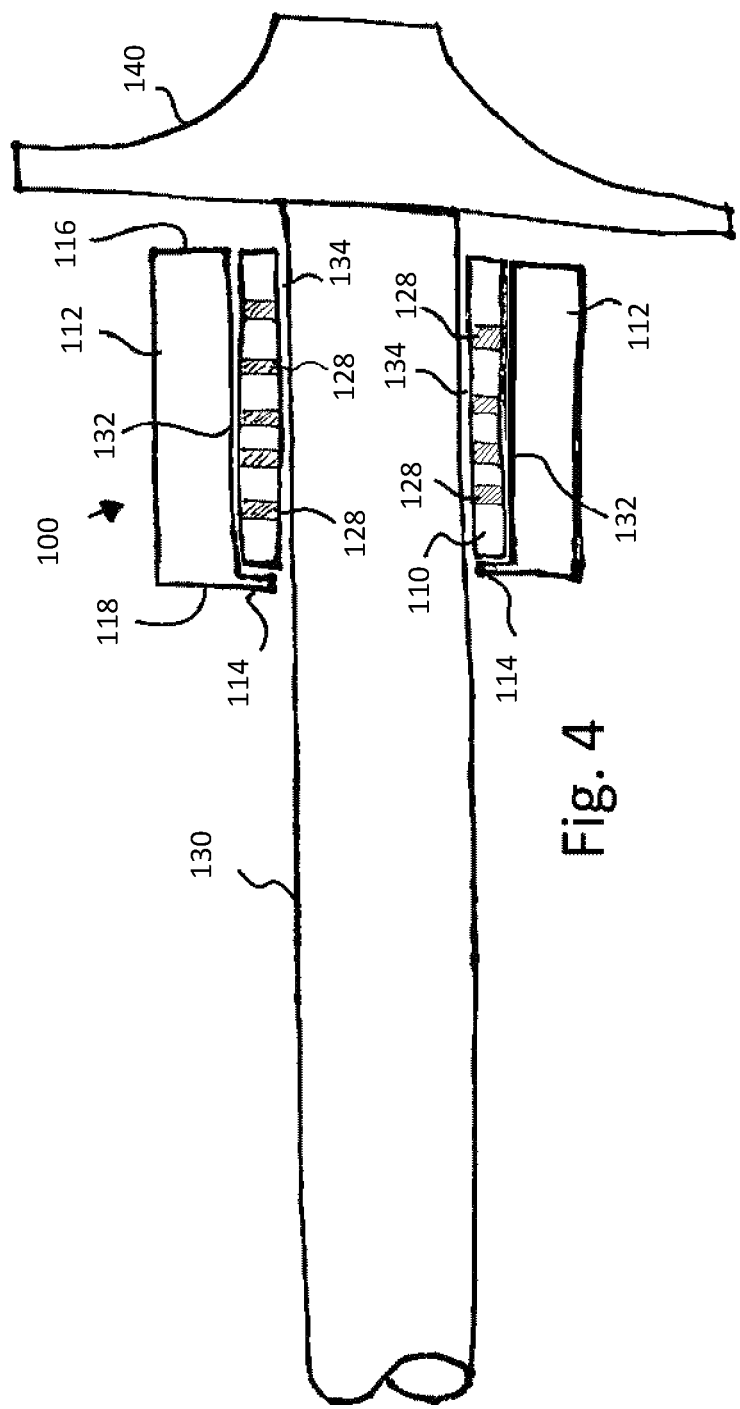
FIG. 4 is a side cut away view of a shaft seal with a shaft and impeller.

FIG. 4 shows an example shaft 130 and impeller 140 with the shaft seal 100 of FIG. 3. The shaft seal 100 separates a high pressure side 116 on the side of the impeller 140 from a low pressure side 118. The shaft seal 100 in this example includes a housing 112 with a shoulder 114 at the low pressure side 118. The housing 112 may include a solid housing wall 132. The bushing 110 may be press fit into the housing 112 so that the outside diameter of the bushing is against the solid housing wall 132. The bushing 110 in this example has holes 128 that are formed parallel to the radius of the bushing 110. The holes 128 may be formed at different angles, and may be round, square, or other shapes. The holes 128 may be a uniform size and shape, or may be different sizes and shapes in one bushing.

FIG. 4 shows a gap 134 between the shaft 130 and the bushing 110. This gap 134 allows the shaft to rotate, and also allows fluid in the gap 134.

The holes 128 may be formed by drilling holes in a bushing before it is press fit into a housing 112. The holes 128 may also be formed by with a mold, for example the bushing 110 may be formed with an injection molding process. The holes may also be formed with a three-dimensional printing process.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. A centrifugal pump comprising:
    an impeller, a rotating shaft, a thermoplastic shaft seal for reducing axial flow of fluid under pressure between a high pressure side and a low pressure side of the rotating shaft, and a housing;
    wherein the housing has a solid housing wall, and wherein the thermoplastic shaft seal is inserted into the housing against the solid housing wall;
    wherein the housing has a shoulder extending toward the rotating shaft at the low pressure side of the rotating shaft to prevent the thermoplastic shaft seal from moving along the rotating shaft;
    wherein the impeller is connected to the rotating shaft, and the rotating shaft is in proximity to and has a clearance to the thermoplastic shaft seal and passes through the thermoplastic shaft seal; and
    wherein the thermoplastic shaft seal has multiple passages that allow fluid under pressure to pass between the rotating shaft and the solid housing wall;
    wherein the thermoplastic shaft seal has an outside radius (R), and a length (L), and an outside surface area, wherein the outside surface area is measured as $2\pi RL$, and wherein the multiple passages between the shaft and the solid housing wall comprise a portion of the outside surface area, and wherein a combination of the portions of the outside surface area from the multiple passages is at least 4 percent of the outside surface area, and no more than 25 percent of the outside surface area.

2. The centrifugal pump of claim 1 wherein the centrifugal pump is a multi-stage high-pressure centrifugal pump.

3. The centrifugal pump of claim 1 wherein the multiple passages are evenly spaced in the thermoplastic shaft seal.

4. The centrifugal pump of claim 1 where a coefficient of thermal expansion of the thermoplastic material is lower than a coefficient of thermal expansion of carbon steel.

5. The centrifugal pump of claim 1 wherein the thermoplastic shaft seal includes a thermoplastic material that is impervious to water.

6. The centrifugal pump of claim 1 wherein the multiple passages are a uniform shape and size.

7. The centrifugal pump of claim 1 wherein the multiple passages are holes each formed parallel to a radius of the rotating shaft.

8. A shaft seal for a rotating shaft of a centrifugal pump comprising:
    an outer layer made from a solid metallic material;
    an inner layer contacting the outer layer, wherein the inner layer is made from a non-metallic material, the inner layer having a first side configured to be in close proximity to the rotating shaft in the centrifugal pump, the inner layer having a second side which is in contact with the outer layer, and wherein the inner layer has multiple holes between the first side and the second side;
    wherein the inner layer has an outside radius (R), and a length (L), and the second side includes an outside surface area, wherein the outside surface area is measured as $2\pi RL$, and wherein the multiple holes between the first side and the second side comprise a portion of the outside surface area, and where a combination of the portions of the outside surface area from the multiple holes is at least 4 percent of the outside surface area, and no more than 25 percent of the outside surface area;
    a shoulder extending from the outer layer toward the inner layer to prevent the shaft seal from moving along the rotating shaft;
    wherein a pumped fluid flows between the rotating shaft and the first side of the inner layer from a high pressure side of the shaft to a low pressure side of the rotating shaft; and
    wherein the shoulder is on the low pressure side of the rotating shaft.

9. The shaft seal of claim 8 wherein the multiple holes between the first side and the second side are evenly spaced around the outside surface area.

10. The shaft seal of claim 8 where a coefficient of thermal expansion of the non-metallic material is lower than a coefficient of thermal expansion of carbon steel.

11. The shaft seal of claim 8 wherein the non-metallic material is impervious to water.

12. The shaft seal of claim 8 wherein the multiple holes are a uniform shape and size.

13. The shaft seal of claim 8 wherein the multiple holes are each formed parallel to a radius of the rotating shaft.

* * * * *